United States Patent [19]

Mygatt et al.

[11] 3,998,413
[45] Dec. 21, 1976

[54] PROTECTIVE SAFETY APPARATUS FOR RAILWAY CARS

[76] Inventors: John M. Mygatt, 5479 Aqua St., Columbus, Ohio 43229; William T. Donohue, Box 265 R.R. 1, Amanda, Ohio 43102

[22] Filed: Aug. 21, 1975

[21] Appl. No.: 606,413

[52] U.S. Cl. .................................. 246/172; 303/1
[51] Int. Cl.² ...................... B60T 7/12; B61H 11/02
[58] Field of Search ............... 246/171, 172, 199; 303/1, 18

[56] References Cited
UNITED STATES PATENTS

| | | | |
|---|---|---|---|
| 1,497,212 | 6/1924 | Hough et al. | 246/172 |
| 1,559,809 | 11/1925 | Tonkinson | 246/172 X |
| 1,661,920 | 3/1928 | Carley | 246/172 |

*Primary Examiner*—Duane A. Reger
*Attorney, Agent, or Firm*—Frank H. Foster

[57] ABSTRACT

Apparatus is disclosed which detects a wheel derailment, detached brake rigging or off center truck of a railway train and automatically switches the air brake system of the train into a state of emergency stop. A pair of synthetic resin tubes with closed lower ends are mounted to a brake bar of each truck and extend outwardly and downwardly toward the track. The tubes are mounted on laterally opposite, interior sides of the wheels. They are connected by flexible air hoses to a manually actuable valve which in turn connects to the main air brake pipe extending longitudinally along the underside of the railway car. The closed ends of the tubes are inwardly and upwardly offset from the rail and positioned for striking the rail or roadbed, rupturing one or more of the tubes and venting the air from the brake line upon the occurrence of one of the above hazardous failures.

4 Claims, 3 Drawing Figures

PROTECTIVE SAFETY APPARATUS FOR RAILWAY CARS

BACKGROUND OF THE INVENTION

The present invention relates generally to railway safety and property protection and more particularly relates to an apparatus for detecting a hazardous failure of the running gear of a railway freight or passenger car, locomotive unit or the associated rails and then immediately and automatically initiating the emergency state of the railway train.

Severe catastrophic railroad train wrecks are usually preceded by a mechanical failure which does not immediately result in a catastrophic crash. Ordinarily a substantial time period elapses after the failure and before the major wreck. Consequently, there is a need for an apparatus which can detect such failures immediately upon their occurrence and automatically apply the train brakes in an emergency state to stop the train before a catastrophic wreck occurs.

For example, it is not unusual for two or four wheels of one truck of a railway car to be removed from their usual engagement with the tracks and yet be dragged unnoticed along the tracks for a considerable distance. While such a derailment may continue for several miles, it ordinarily produces only minor damage. However, it can result in a catastrophic wreck if the derailed truck strikes a highway crossing, switching gear or the like which can catch the derailed wheels and cause one or more cars to entirely leave the track.

The relatively minor derailment described above ordinarily goes unnoticed by the train and engine crew unless they are signalled by a yard man or another person who observes the derailed wheels being dragged along the track. There is therefore a need for an apparatus which will detect such a minor derailment and immediately put the train into emergency stop.

Similarly, there are other mechanical failures which do not immediately cause catastrophic damage but which, if left undetected, can eventually produce severe damage and eventually catastrophic derailment. For example, occasionally the center pin of the railway truck sheers off permitting the truck to slide off center. In other instances a part of the brake rigging which is mounted to the truck for actuating the brake shoes has been broken and dropped toward the road bed.

There is therefore a need for a single apparatus which can detect all of the aforementioned mechanical failures and immediately and automatically throw the train into an emergency state without requiring the intervention of the engineer.

Prior workers in the art have disclosed systems for causing the breakage of an air conducting tube, which is connected to the air brake system of the car, upon a railway car derailment. While most of these prior art systems will respond to at least one hazardous condition, the prior art devices exhibit two types of weaknesses. Firstly, they do not respond to all the hazardous failure conditions which are described above and secondly, many are falsely actuated by nonhazardous conditions normally encountered by a railway car.

For example, some of the prior art devices are mounted to the body of the railway car and therefore may be actuated and switch the train into an emergency state as a result of a normal, lateral, rocking motion of the railway car. Still others are mounted to extend to a position immediately above a track and consequently when the wheels of the train become derailed and offset from the track, the prior art device is similarly misaligned and is not actuated.

Still other prior art devices are mounted on the lateral, exterior sides of the wheels making them attractively available for unwanted tampering or vandalism by persons along the track. This accessibility similarly makes them more likely to be struck by obstructions along the sides of the track. Other prior art devices require the mounting of one detector for each wheel of the car therefore requiring excessive cost and labor.

Still other prior art devices depend upon mechanical linkages for actuating valves and consequently are of reduced reliability after having been exposed to the corrosive environment of railway vehicles.

SUMMARY AND OBJECTS OF THE INVENTION

It is therefore a primary object of the invention to provide an apparatus which can minimize or prevent property damage and personal injury resulting from hazardous mechanical failures of railway running gear.

It is another object of the invention to provide an apparatus which can immediately and automatically switch a train into its emergency state in response to a derailment brake rigging failure, or the sheering off of the truck center pin.

It is a further object of the present invention to provide such an apparatus which has a high reliability because of its simplicity and absence of moving parts.

Still another object and feature of the present invention is to provide a device which requires a minimum of inexpensive parts and is easily installed so that the railroad companies can afford to and will install and use such equipment.

Still another object of the present invention is to provide an apparatus which can be installed upon the truck without significant modification or alterations to other mechanisms of the truck. A substantially uniform mounting means can be used and without requiring welding to the arch bar.

The present invention contemplates a pair of frangible tubes mounted to and downwardly extending from opposite sides of the center of each truck of the railway car laterally inwardly of and longitudinally intermediate the wheels which are journalled to the truck. Each of these tubes has a closed lower end positioned inwardly offset from alignment with the track-engaging surface of the wheels. Flexible air hose means are connected between the tubes and the air brake pipe of the car for providing sealed air communication between each of the tubes and the air brake system of the car. With this apparatus, a rupture of one of said tubes or air hose means vents air from the air brake system of the car to the atmosphere thereby initiating an emergency stop.

Further objects and features of the invention will be apparent from the following specification and claims when considered in connection with the accompanying drawings illustrating the preferred embodiments of the invention.

Figure 1:
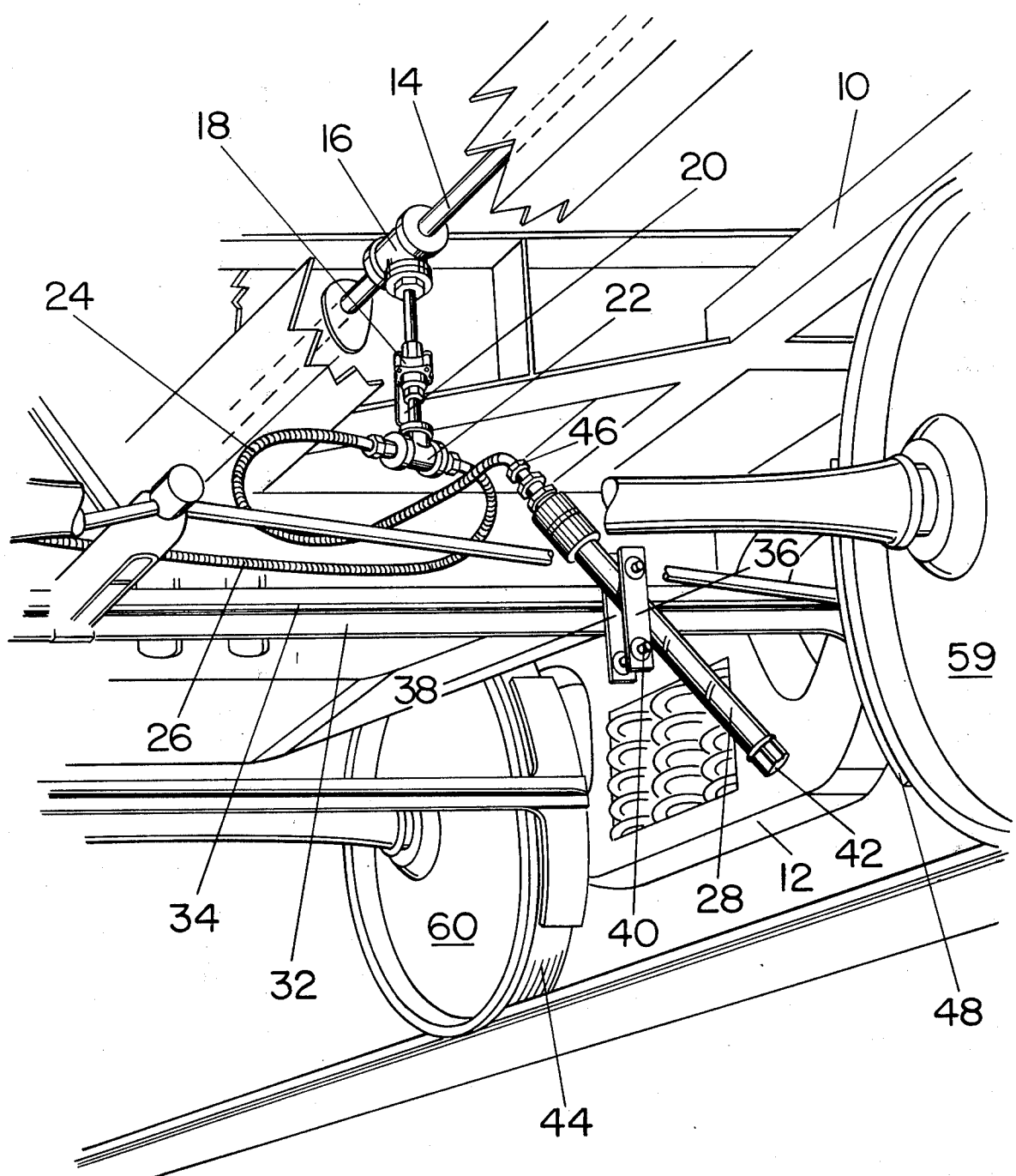
FIG. 1 is a view in perspective illustrating the preferred embodiment of the invention mounted to a railway car.

In describing the preferred embodiment of the invention illustrated in the drawings, specific terminology will be resorted to for the sake of clarity. However, it is not intended to be limited to the specific terms so selected and it is to be understood that each specific term includes all technical equivalents which operate in a similar manner to accomplish a similar purpose.

DETAILED DESCRIPTION

The conventional, modern air brake system for a railway train includes a longitudinally extending air brake pipe mounted on the underside of each car. Each end of the pipe is provided with a manually operable stop cock to which a flexible air brake hose is connected for attachment to the adjacent cars in the train. The longitudinally extending brake pipe of each car is connected to a control valve mounted beneath each car which in turn is connected to the brake cylinders and to a dual compartment reservoir.

According to conventional operation, air under pressure in a service or auxiliary reservoir of the dual compartment reservoir is utilized to actuate the brake cylinder and in turn the brake shoes in response to a reduced pressure in the longitudinally extending brake pipe. Thus, for normal operation, the engineer in the locomotive may reduce the brake pipe pressure in each car along the train to control the force with which the brakes are applied.

However, air under pressure in the emergency reservoir is available to immediately apply full force to the brake shoes to stop the train as quickly as possible in the event of a sudden loss of pressure in the brake pipe. Consequently, conventional air brake systems for railways are designed to switch to an emergency state, immediately applying the brakes of the car, in response to a sudden loss of air pressure.

FIG. 1 illustrates a portion of a railway car 10 and a truck 12 mounted beneath the car 10. The standard air brake pipe 14 has been modified by insertion of a tee 16 which is connected through a manually operable valve 18 controlled by a lever arm 20. The valve 18 is open during normal operation.

Figure 2:
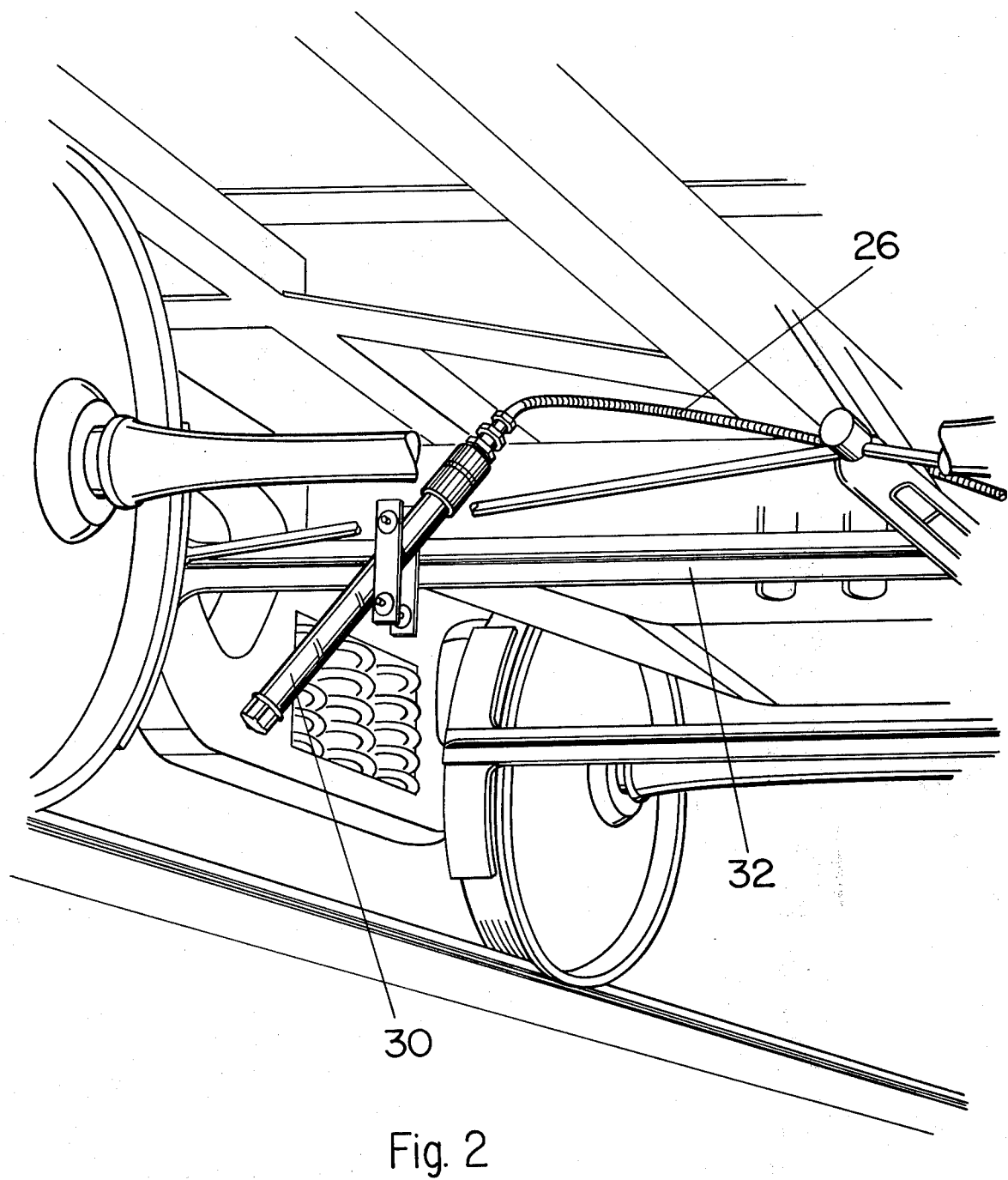
FIG. 2 is a view in perspective illustrating a further portion of the preferred embodiment of the invention illustrated in FIG. 1.
Figure 3:
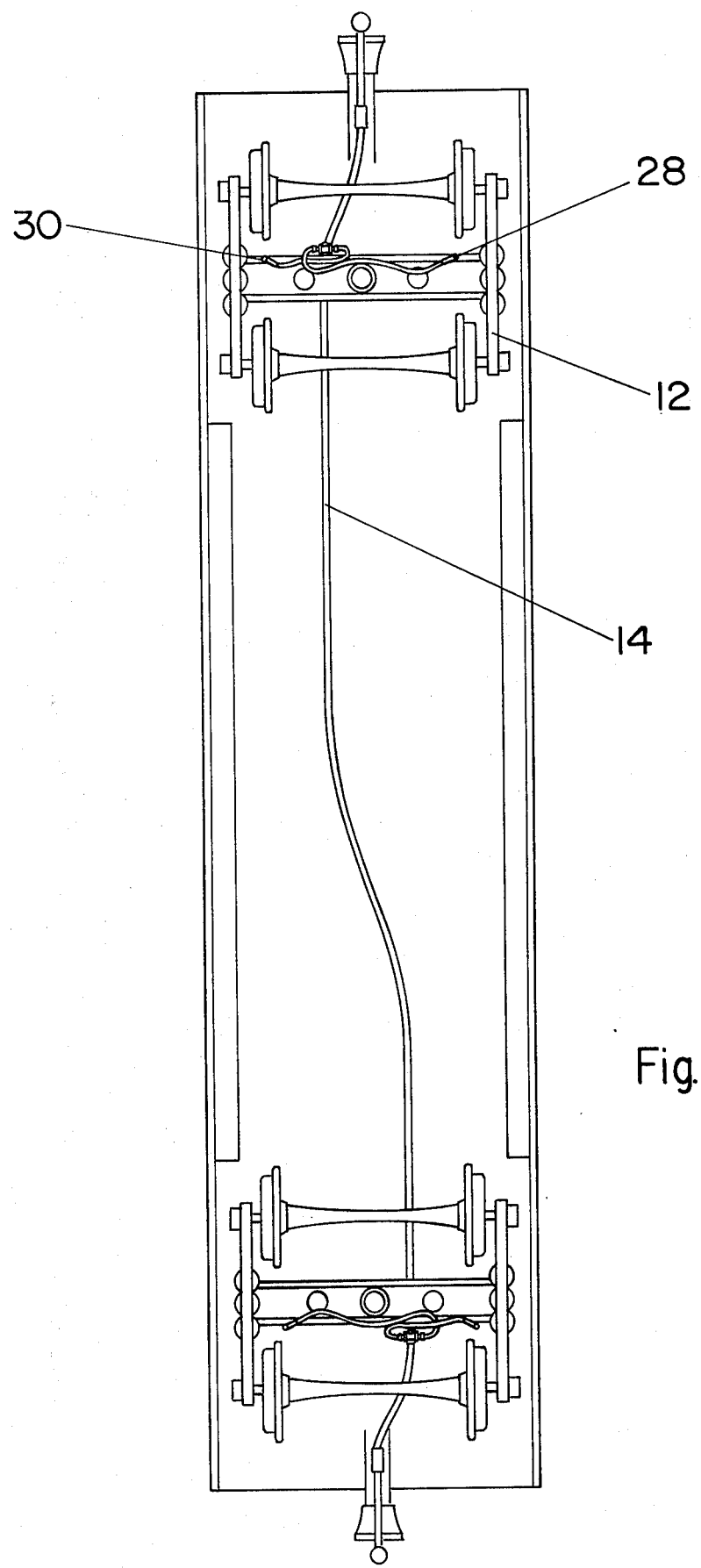
FIG. 3 is a bottom view of a railway car illustrating the attachment thereto of an apparatus embodying the present invention.

The valve 18 is connected to a second tee 22 which in turn is connected in communication with a pair of flexible air hoses 24 and 26. Preferably, the air hoses 24 and 26 are ¾ inch tubing when used with the usual 1¼ inch main brake pipe 14. Each of the flexible air hoses is connected into sealed air communication with a frangible tube such as tube 28 illustrated in FIG. 1 and tube 30 illustrated in FIG. 2. Air hose 24 is connected to tube 28 and air hose 26 is connected to tube 30.

Each of the frangible tubes 28 and 30 are preferably mounted to the brake bar 32 of the truck 12. Since the brake bar 32 is conventionally formed with a rib 34 and tapered upper and lower web portions, the tubes such as tube 28 are preferably mounted by means of a clamp jaw 36 and a mating associated clamp jaw 38 which has been molded to firmly mate against the contours of the brake bar 32. A U-bolt 40 extends through the clamp jaws 36 and 38 and around the opposite side of the brake bar 32 to retain the frangible tube 28 tightly in the jaws and fixed to the brake bar 32.

The frangible tubes 28 and 30 are mounted so that they extend downwardly and outwardly on opposite sides of the center of each truck in a position laterally inwardly of and longitudinally intermediate the wheels, such as wheels 59 and 60 which are journalled to the truck. Because they are intermediate the wheels, one frangible tube protects both wheels and will not be ruptured by a low joint.

Each of the frangible tubes, such as tube 28, has a closed lower end 42 which may comprise, for example, a steel cap threadedly engaged to the tube 28. Alternatively, the tube 28 may be manufactured with a unitary closed end. The lower end 42 is positioned inwardly offset from alignment with the track engaging surface 44 of the wheels.

The frangible tubes must be sufficiently strong that rocks, ice and the like do not cause breakage of the tube and yet sufficiently breakable to permit the tube to be ruptured and vent air to the atmosphere upon a derailment or other hazardous malfunction. The tubes should be sufficiently large to permit rapid air venting and preferably are at least as large as the flexible tubes 24 and 26.

We have found it desirable to form the frangible tubes of a synthetic resin and have further found it desirable to provide each tube with a threaded upper end which is connected by a hexagonal, wrench-receiving fitting to the flexible hose in order to permit on-site replacement of a ruptured frangible tube after a derailment or other hazardous malfunction has been corrected.

Mounting the frangible tubes to the brake bar 32 not only provides a convenient and relatively standard structure to which the frangible tubes can be quckly, easily and inexpensively mounted, but also such mounting serves to permit the frangible tube 28 to be ruptured upon the dropping of the brake bar 32 so that the train brake system will be immediately switched into the emergency state. Furthermore, attachment to the brake bar avoids any need to attach the tubes to the arch bars which are of greatly varied designs and to which welding is prohibited. The clamping structure described provides a relatively uniform means of attachment to all modern railway cars.

The frangible tubes should be mounted sufficiently far from the brake shoes, such as brake shoe 38, that they will not be damaged by the high temperatures, often reached by the brake shoe. Yet they should be mounted close enough to the wheel that they will strike and be ruptured by the underlying rail upon derailment of a wheel.

We have found it preferable to align the frangible tubes such as tube 28 so that it points towards its associated rail and terminates 3.75 inches above the rail and 4.5 inches inwardly from the rail.

Preferably, the flexible air hose means, such as air hoses 24 and 26 are armored by a surrounding metal spiral or helix which increases stiffness and prevents abrasion of the tubes and reduces the likelihood that a flying stone or other object may break the flexible hose. Yet, the air hoses are free to flex with the truck and with the brake movement.

The operation of an apparatus embodying the present invention illustrates the importance of the proper combination of the structural features of the equipment which is added to the railway car and the placement of that equipment in order to obtain an efficient and effective safety device which will be easily and inexpensively installable on modern railway trucks.

It is apparent that structure embodying the present invention, when mounted to a railway car which is either traversing along a track or sitting in a yard, is inaccessible because it is mounted between the wheels of the truck. In fact, it is unlikely that this structure would be noticed by a person passing by.

If a car journeying along a track suddenly has one of its wheels derailed, such as wheel 60, the lower end 42 of the frangible tube 28 will be driven into the rail and broken.

This will cause an immediate venting of air from the main brake pipe 14 and, in accordance with conventional operation of the air brake system, will immediately switch the train into its emergency state. The brakes will therefore be immediately and automatically applied to bring the train to a safe halt. It should also be noted and it is of importance that the brakes of the entire train and not just the brakes of the derailed car are immediately applied to prevent the holocaust which could result from the buckling of the cars.

The engineer will immediately notice from the air pressure gauge in the locomotive that the train has switched into the emergency state and consequently can make an investigation as soon as the train stops.

When a wreck crew replaces the derailed wheel properly on the rail, the manually operable valve 18 may be closed so that the main brake pipe 14 may again be pressurized and the train may continue on its way until further repairs can be made.

Alternatively, the frangible tube 28 may be replaced at the derailment site merely by loosening the clamps 36 and 38 and detaching the air hose by the hex connector 46 and replacing them with new structure.

Similarly, if the brake bar becomes detached from the truck and falls, the frangible tubes will be broken and switch the train into an emergency state in a similar manner.

If the center pin of the truck should become sheared so that the truck slides relative to the car, this too will cause the flexible air hoses, such as hoses 24 and 26, to be pulled apart and broken. The breakage of a flexible air hose will likewise cause venting of air from the main air brake pipe 14 14 to switch the entire train into its emergency state.

Therefore, it can be seen, that we have provided a safety detector apparatus which automatically throws the train into emergency upon the occurrence of any one of three possible mechanical malfunctions and therefore will stop the entire train before catastrophic property damage and injury are caused.

It is to be understood that while the detailed drawings and specific examples given describe preferred embodiments of the invention, they are for the purposes of illustration only, that the apparatus of the invention is not limited to the precise details and conditions disclosed and that various changes may be made therein without departing from the spirit of the invention which is defined by the following claims.

What is claimed is:

1. An apparatus for detecting a derailment of a railway car having an air brake system, including a longitudinally extending train line air brake pipe for series connection to the air brake pipes of other railway cars, and for automatically initiating the emergency braking of said cars, said apparatus comprising:
   a. a pair of frangible tubes mounted to and downwardly extending from opposite sides of the center of each truck of said car laterally inwardly of and longitudinally intermediate wheels which are journalled to said truck, each of said tubes mounted to a brake bar of said truck and having a closed lower end and positioned offset from alignment with the track engaging surface of said wheels;
   b. flexible air hose means connected between said tubes and the air brake pipe of said car for providing sealed air communication between each of said tubes and the air brake system of the car; and
   c. a manually operable air valve interposed in the sealed air communication between said air brake pipe and said tubes;
whereby a rupture of one of said tubes or air hose means vents air to the atmosphere.

2. An apparatus according to claim 1 wherein said tubes are clamped to said brake bar by clamp members which are shaped to conformingly mate with the contours of said brake bar, said tubes being spaced inwardly from the brake shoes sufficiently to avoid thermal damage and angularly inclined to extend substantially toward the underlying railroad track.

3. An apparatus according to claim 2 wherein each of said tubes are positioned with their lowermost closed end substantially 3¾ inches higher than said rail and inwardly offset from said rail by substantially 4½ inches.

4. An apparatus according to claim 3 wherein said tubes and said flexible air hose means have an internal diameter greater than ½ inch.

* * * * *